Nov. 22, 1960 R. D. ALLEN 2,961,491

CHANNEL MONITOR UNIT FOR TIME DIVISION MULTIPLEX SYSTEM

Filed Aug. 5, 1958 4 Sheets-Sheet 1

INVENTOR
R. D. ALLEN
BY Charles S. Phelan
ATTORNEY

INVENTOR
R. D. ALLEN
BY Charles S. Phelan
ATTORNEY

Nov. 22, 1960 R. D. ALLEN 2,961,491

CHANNEL MONITOR UNIT FOR TIME DIVISION MULTIPLEX SYSTEM

Filed Aug. 5, 1958 4 Sheets-Sheet 3

INVENTOR
R. D. ALLEN

BY Charles S. Phelan

ATTORNEY

Nov. 22, 1960 R. D. ALLEN 2,961,491

CHANNEL MONITOR UNIT FOR TIME DIVISION MULTIPLEX SYSTEM

Filed Aug. 5, 1958 4 Sheets-Sheet 4

INVENTOR
R. D. ALLEN

BY [signature]

ATTORNEY

United States Patent Office 2,961,491

Patented Nov. 22, 1960

2,961,491

CHANNEL MONITOR UNIT FOR TIME DIVISION MULTIPLEX SYSTEM

Robert D. Allen, San Fernando, Calif., assignor to Western Electric Company, Incorporated, New York, N.Y., a corporation of New York Filed Aug. 5, 1958, Ser. No. 753,384

15 Claims. (Cl. 178—69)

This invention relates to a device for monitoring electric signal transmission in a single one of the multiplexed signal channels of a time division multiplex signal.

In certain time division multiplex transmission systems a single radio frequency transmission band may be utilized to transmit a plurality of individual electric signals. Each of the individual signals is sampled at a predetermined rate and the resultant signal samples are interleaved with one another to constitute the multiplex signal which is then transmitted in one frequency band that is available. In the transmitting terminal where the interleaving, or multiplexing, of the signals takes place, a time base voltage is generated at a predetermined frequency and utilized to actuate the signal sampling apparatus. A clocking voltage is also generated in the transmitting terminal, and it comprises a series of pulses at a frequency which is substantially lower than the time base frequency. The clocking pulses are utilized to indicate the end of a sampling interval during which each of the individual signals has been sampled a predetermined number of times.

In certain situations it is desirable to monitor the transmission in an individual channel in the multiplexed output of a transmitting terminal. However, this sampling must be accomplished with a minimum disturbance to the multiplexed signal output. In addition, it is advantageous to be able to accomplish the monitoring operation with equipment which is separate from, and considerably simpler than, the demultiplexing equipment which might be available in receiving terminal equipment for use in connection with the transmission system.

Accordingly, it is one object of the invention to extract from a time division multiplex signal the individual signal information representing transmission in a single one of the multiplexed channels thereof.

Another object is to monitor electric signal transmission during a predetermined cyclically recurring time interval.

It is a further object to demultiplex a time division multiplex signal in respect to a single one of the composite signals thereof.

An additional object is to generate timing, or sampling, signals for use in monitoring the portions of a time division multiplex signal representing signal transmission in a single channel.

Another object of the invention is to combine a time division multiplex signal with signal sampling voltages whereby the multiplex signal portions representing signal transmission in a single channel are applied to a monitoring transducer while other multiplex signal portions are rejected.

These and other objects of the invention are realized in an illustrative embodiment thereof in connection with a frequency shift, telegraph, time division multiplex system in which multiplexed telegraph mark and space signals, data signals, are converted by a frequency discriminator to voltages of different amplitudes, respectively. Clock pulses from a transmitter terminal are utilized to preset the phase of the output of a frequency divider circuit to a predetermined relationship with respect to such clock pulses. The frequency divider circuit is then driven by time base signals from the transmitter terminal, and outputs are derived from different portions of the frequency divider circuit for sampling a selected one of the available channels in either a two-channel or four-channel multiplex transmission operation. The sampling signals and the mark-space signals are combined in a unique diode switch to derive voltage signals representing the mark and space signals in only the desired one of the multiplexed signal channels. These voltage signals are converted by a suitable transducer into visible representations of the desired signal.

A better understanding of the invention may be obtained by an examination of the following detailed description thereof in connection with the attached drawing in which.

Figure 3:
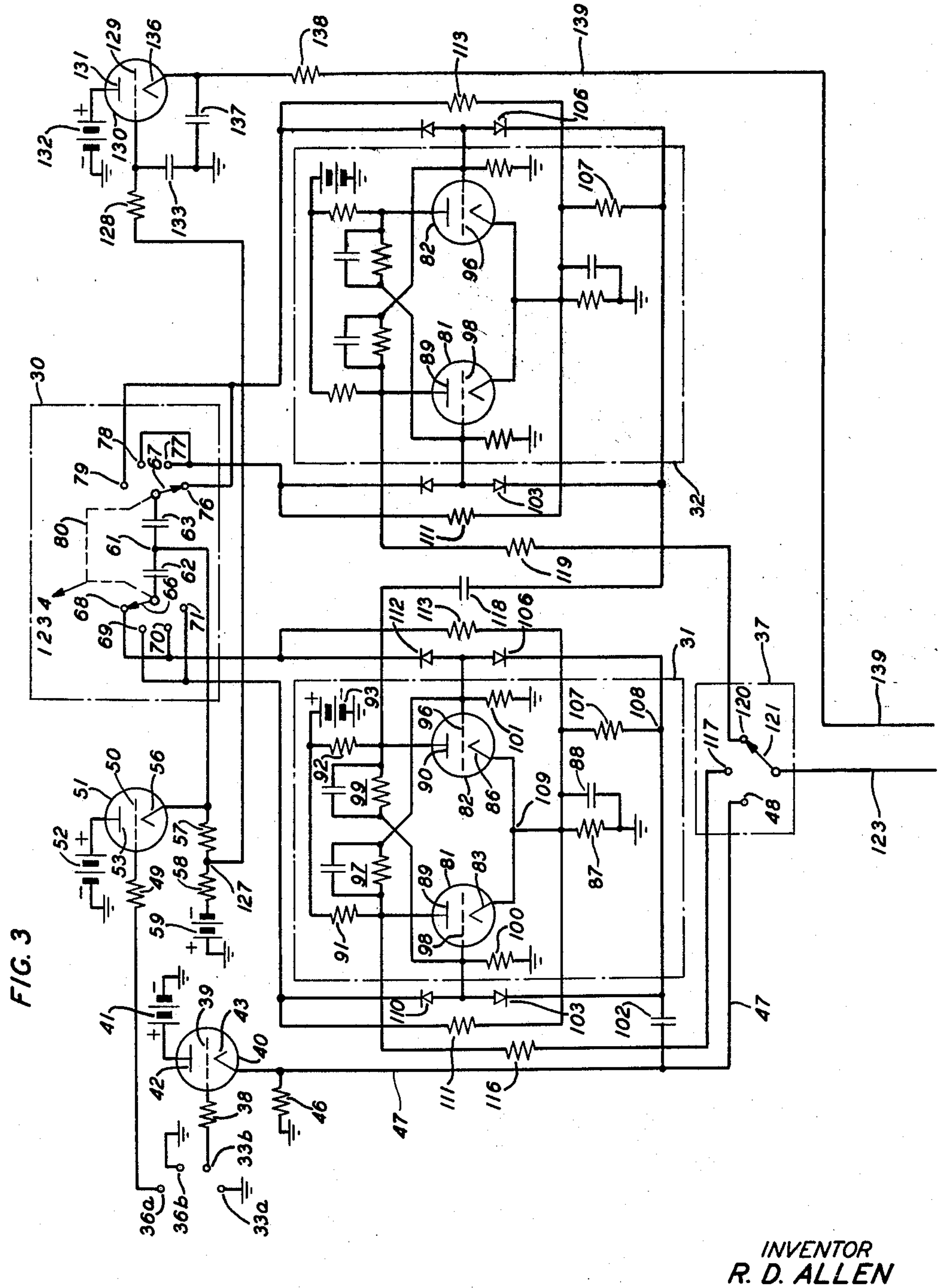
Figure 4:
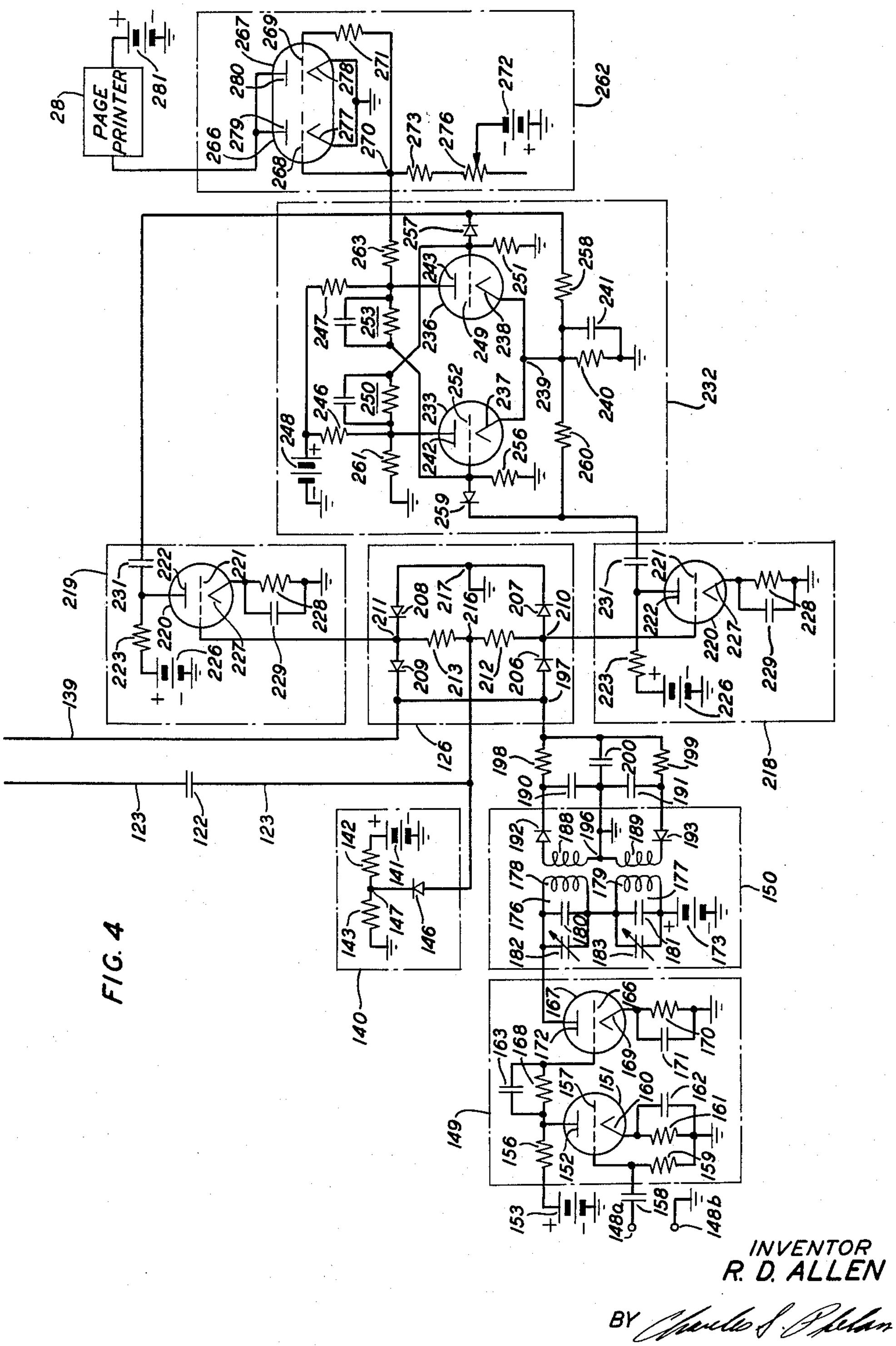
Figure 5:
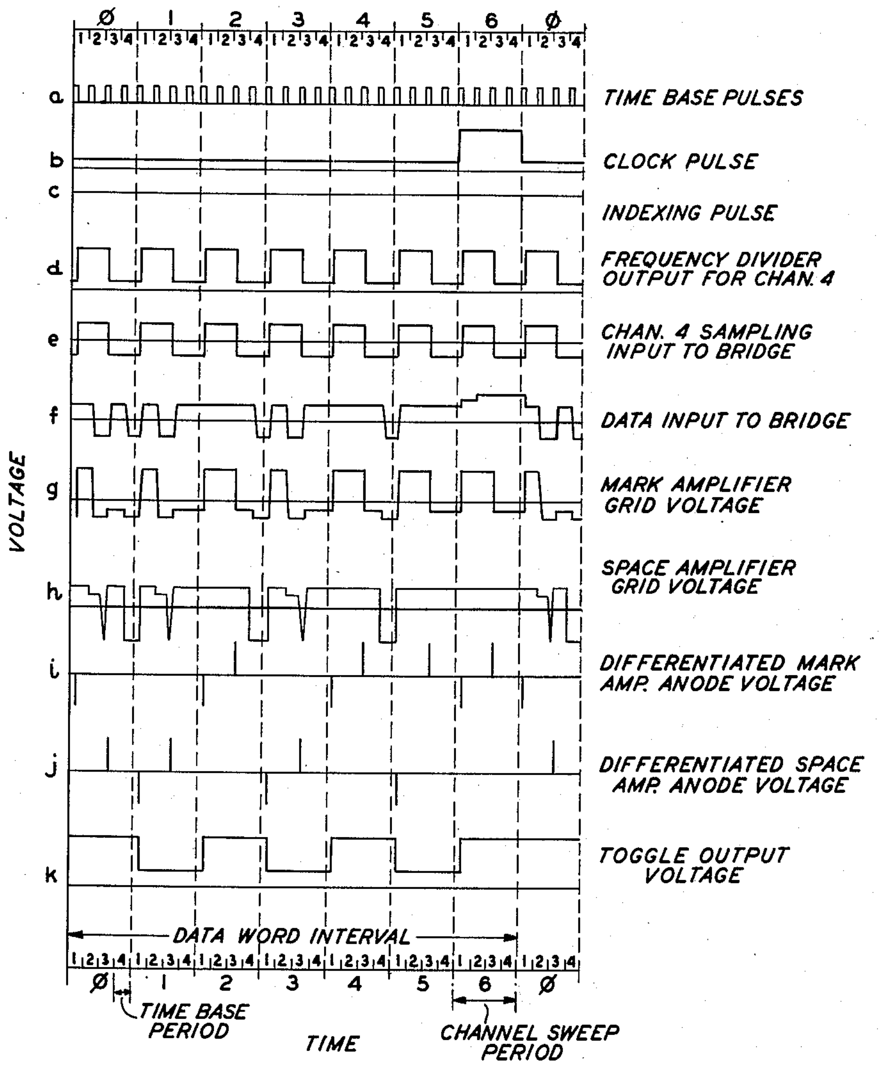

Figs. 3 and 4, taken together, comprise a schematic diagram of an illustrative embodiment of a monitor unit in accordance with the invention; and Fig. 5 is a timing diagram including voltage waveforms *a* through *k* illustrating the operation of the embodiment shown in Figs. 3 and 4.

Figure 1:
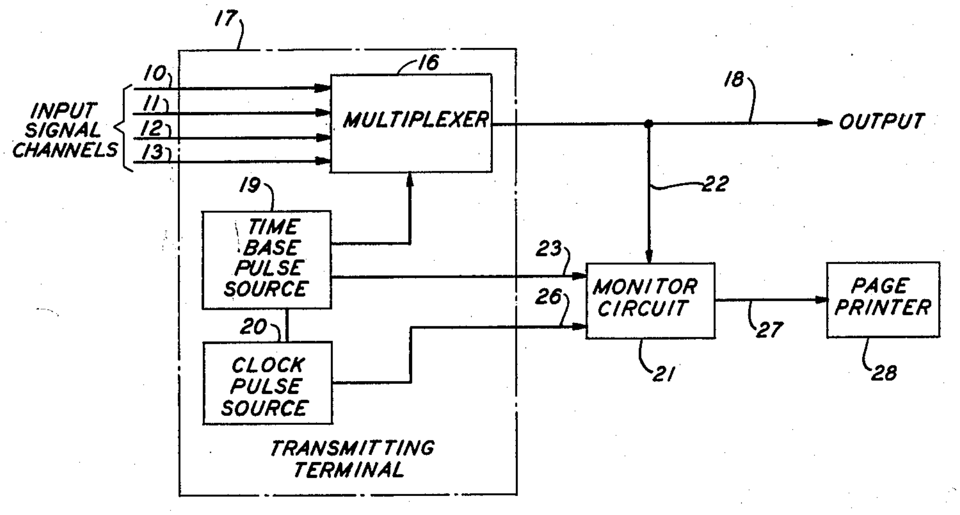
Fig. 1 is a simplified block and line diagram of relevant portions of a time division multiplex transmitter terminal illustrating one manner of association therewith of the monitor unit in accordance with the invention.

Referring to Fig. 1, signals in four input signal channels 10, 11, 12, and 13 are applied to a multiplexer 16 in a transmitting terminal 17. Mark and space signals, data signals, on the four channels 10 through 13 are sampled in multiplexer 16, the samples are interleaved with one another to form a multiplex signal, and the multiplex signal is applied from the multiplexer to a suitable radio or wire transmitting medium schematically indicated by the line 18. A source 19 of time base pulses is provided in the transmitting terminal 17 for controlling the signal channel, sampling operation in multiplexer 16. The output frequency of source 19 thus establishes the channel scanning rate, which is the same as the multiplex bit rate. The rate at which an individual channel is sampled will, of course, be less than the channel scanning rate if more than one channel signal is being transmitted. Multiplexer 16 repeatedly scans all channels at channel scanning rate thereby establishing the channel sweep frequency and the channel sweep period, i.e. the time required to accomplish one complete scan of all channels. The channel sweep frequency and the frequency at which one channel is sampled are the same, but the term "sweep frequency" is employed since it is convenient in the subsequent description to use the term "channel sweep period" which is a function of the sweep frequency.

A source 20 of clock pulses is also provided in transmitting terminal 17. The frequency of the output from source 20 is generally much lower than the output frequency from source 19 and may be derived from source 19. For example, the output frequency of source 20 may be one twenty-eighth of the output frequency of source 19. The clock pulses are primarily utilized in terminal 17 for a purpose which is not directly related to the invention. However, the same output is also available for use in connection with the invention to mark the end of a data word interval, the time required to complete a predetermined number of channel sweep periods. The fixing of a data word interval, of course, establishes the data, or multiplex, word rate. Terminal 17 may be set (by means not shown) for different modes of operation in accordance with the number of signal channels to be multiplexed. The modes of operation are conventionally designated "MUX 1" when only one channel is to be transmitted, and "MUX 2" or "MUX 4" when two or four channels are to be transmitted.

A monitor circuit 21 in accordance with the invention receives the multiplexed signal from the transmitting medium 18 via a connection 22. The operation of monitor circuit 21 is controlled by pulses applied thereto from time base pulse source 19 and clock pulse source 20 via the leads 23 and 26, respectively. The output of monitor circuit 21 comprises signals representing the transmission in a single one of the channels 10 through 13 and is coupled via lead 27 to a suitable transducing device 28 for converting the output of monitor circuit 21 into visible representations. The device 28 may, for example, comprise a teletypewriter page printing mechanism.

Figure 2:
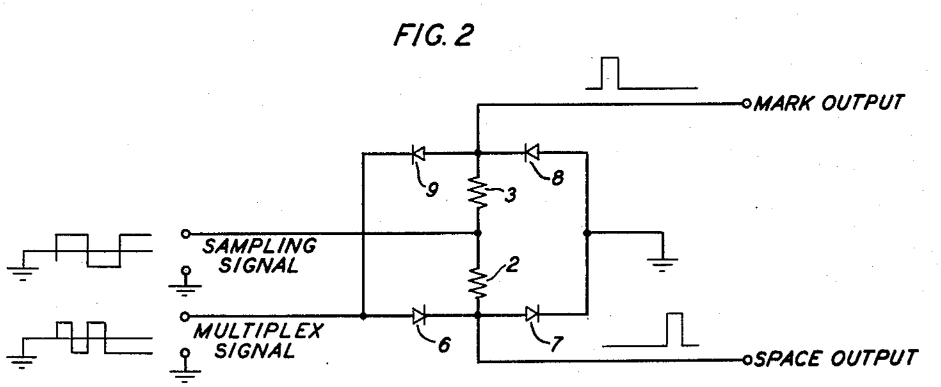
Fig. 2 is a schematic diagram of a gate circuit which is employed in the monitor unit in accordance with the invention.

A principal portion of monitor circuit 21 is a diode bridge circuit, illustrated in Fig. 2, which functions as a gate circuit, or electronic switch. The bridge comprises four diodes 6, 7, 8, and 9 connected in series in a closed loop. The four diodes are all poled for conduction in a counterclockwise direction. Two large resistors 2 and 3 are connected in series across one diagonal of the bridge. The resistances of resistors 2 and 3 may, for example, be about one megohm each. The multiplex signals are applied across one diagonal of the bridge with mark and space signals being positive and negative, respectively, with respect to ground.

The multiplex signals bias the bridge diodes Off and On in pairs with the result that each of the mark and space output leads of the bridge is alternately clamped at a very low potential when the pair of diodes to which it is connected is biased On. When the pair of diodes to which the mark or space lead is connected is biased Off, the potential at such lead tends to follow the potential of the sampling signal applied to the common terminal of resistors 2 and 3. Thus, the outputs on the mark and space leads comprise positive-going pulses which occur when a positive-going sampling signal is coincident with a mark or a space, respectively, in the multiplex signal. This operation is illustrated in a general manner by the voltage waveforms adjacent to the mark and space output leads in Fig. 2. The operation of this type of gate circuit will be discussed in more detail in connection with Fig. 4.

The circuits of Figs. 3 and 4 may be combined by placing Fig. 3 above Fig. 4 in a single plane to obtain the complete schematic diagram for monitor circuit 21 of Fig. 1. The circuits illustrated in Fig. 3 comprise a source of timing signals and they are arranged for generating single-channel timing, or sampling, signals for use in monitor circuit 21 for sampling time division multiplex signals. These circuits comprise a channel selector switch 30, two bistable multivibrators 31 and 32 which are connected together in a frequency divider circuit, and a selector switch 37 for selecting the mode of operation of the timing signal generating circuits of Fig. 3 to correspond to the mode of multiplex operation of the transmitting terminal which is being monitored. Switch 37 is adapted to select a sampling output which is suitable for one-channel, two-channel, or four-channel multiplex operation, and is conventionally referred to as a MUX selector switch.

Terminals 33*a* and 33*b* comprise an input circuit for receiving time base pulses from the source 19 in transmitting terminal 17. Terminal 33*a* is grounded and terminal 33*b* is connected via a resistor 38 to a control grid 39 in a vacuum tube triode 40 which is arranged in a cathode follower circuit. A battery 41 which has the negative terminal thereof grounded supplies voltage from the positive terminal thereof to the anode 42 of triode 40. The cathode 43 of triode 40 is connected to ground by means of a load resistor 46. The output of the cathode follower circuit is connected by a lead 47 to one contact 48 of MUX selector switch 37.

Terminals 36*a* and 36*b* of monitor circuit 21 comprise an input circuit for receiving clock pulses from source 20 in transmitting terminal 17. Terminal 36*b* is grounded and terminal 36*a* is connected via a resistor 49 to a control grid 50 of a vacuum tube triode 51 which is arranged in a cathode follower circuit. A battery 52 which has the negative terminal thereof grounded supplies potential from the positive terminal thereof to the anode 53 of triode 51. The cathode 56 of triode 51 is connected to ground via a resistor 57, a resistor 58, and a battery 59 all connected in series in the order named. The positive terminal of battery 59 is grounded. The output from this cathode follower circuit is coupled from cathode 56 to a terminal 61 which is illustrated in channel selector switch 30.

Terminal 61 is connected via a pair of capacitors 62 and 63 to the armatures 66 and 67 of channel selector switch 30. Switch 30 is provided with contacts 68 through 71 which are associated with armature 66, and contacts 76 through 79 which are associated with armature 67. Armatures 66 and 67 are illustrated in contacting engagement with contacts 68 and 76, respectively, and are mechanically coupled together as schematically represented by the dotted line 80 for simultaneous operation to other ones of the contacts associated therewith. In the position illustrated, the channel selected for monitoring would be channel 4 as indicated by the arrow from broken line 80 to the numeral 4 in the upper left hand portion of the schematic representation of switch 30. The operation of the armatures 66 and 67 in a counterclockwise direction would select successively channels 3, 2, and 1 for monitoring.

Multivibrator 31 comprises two triodes 81 and 82 having the cathodes 83 and 86 thereof connected together and connected to ground by means of a resistor 87. A signal by-pass capacitor 88 is connected in parallel with resistor 87. Operating potential is supplied to the anodes 89 and 90 of triodes 81 and 82, respectively, via load resistors 91 and 92 from a battery 93 which has the negative terminal thereof connected to ground. Anode 89 is cross coupled to the control grid 96 of triode 82 by means of a parallel resistance-capacitance circuit 97 connected therebetween. Anode 90 is cross coupled to control grid 98 of triode 81 by means of a parallel resistance-capacitance circuit 99 connected therebetween. Control grids 98 and 96 are returned to ground by resistors 100 and 101, respectively.

Time base pulses are coupled from lead 47 via a capacitor 102 and a pair of diodes 103 and 106 to control grids 98 and 96, respectively. Diodes 103 and 106 are poled for conduction of electric current away from their respective control grids. A resistor 107 is connected between a terminal 108 which is common to the cathodes of diodes 103 and 106 and a terminal 109 which is common to cathodes 83 and 86. Capacitor 102 and resistor 107 comprise a differentiating circuit as will be hereinafter described.

The contacts 69 and 71 of channel selector switch 30 are connected in multiple to control grid 98 by means of a diode 110 which is poled for conduction away from grid 98. Contacts 69 and 71 are also connected to the terminal 109 by means of a resistor 111. Capacitor 62 and resistor 111 comprise a differentiating circuit as will be hereinafter described. Contacts 68 and 70 of switch 30 are connected in multiple to control grid 96 and terminal 109 by means of a diode 112 and a resistor 113, respectively, in a manner which is similar to the connections recited above for contacts 69 and 71 of switch 30.

The outputs from multivibrator 31 are coupled from anode 89 via a resistor 116 to a contact 117 in MUX selector switch 37 and from anode 90 via a capacitor 118 to multivibrator 32. The structure of multivibrator 32 is identical to the structure of multivibrator 31, and the input connections thereto from contacts 76 through 79 of switch 30 via diodes are similar to the connections from contacts 68 through 71 to the inputs of multivibrator 31. Also, the input connections to multivibrator 32 from capacitor 118 are similar to the input connections to multivibrator 31 from capacitor 102. Accordingly, the same reference characters are used to designate corresponding circuit elements in multivibrator 32 and in the input connections thereto. The output of multivibrator 32 is derived from anode 89 thereof and applied via a resistor 119 to a contact 120 in MUX selector switch 37.

The output from MUX selector switch 37 is derived from an armature 121 therein which is illustrated in contacting engagement with the contact 120. Armature 121 is connected via a coupling capacitor 122 (illustrated in Fig. 4) and a lead 123 to a diode bridge circuit 126 in Fig. 4.

A terminal 127 which is common to the cathode load resistors 57 and 58 of triode 51 is connected via a resistor 128 to a control grid 129 in a vacuum tube triode 130. Operating potential is supplied to anode 131 of triode 130 by means of a battery 132 which has the negative terminal thereof grounded. Control grid 129 is connected to ground by a capacitor 133 and the cathode 136 of triode 130 is connected to ground by a capacitor 137. Cathode 136 is also connected to the diode bridge 126 in Fig. 4 by means of a resistor 138 and a lead 139. The combination of resistor 128 and capacitor 133 connected to control grid 129 and the combination of resistor 138 and capacitor 137 connected to cathode 136 each comprises an integrating circuit for the purpose of delaying the clock pulses to provide a mark reinsertion signal as will be hereinafter described.

Since the monitoring of a single one of a plurality of time division multiplexed signal channels obviously requires an element of timing, the discussion of the operation of the monitoring may best be started by considering the timing thereof. The operation of the timing voltage generating portion of monitor circuit 21 as illustrated in Fig. 3 may be considered with reference to the timing diagram of Fig. 5 which includes the waves *a* through *k* illustrated with respect to individual zero voltage ground reference lines. The common time scale which is indicated at both the top and the bottom of Fig. 5 for all of the illustrated waveforms comprises one data word interval plus one channel sweep period. The data word interval may have a duration, for example, of 154 milliseconds, and it is subdivided into a number of channel sweep periods such as the seven 22 millisecond periods illustrated. Each channel sweep period is subdivided into a plurality of time base periods corresponding to the maximum number of channels which the multiplex system is handling in the mode of operation being utilized for the transmission facility represented by line 18 in Fig. 1. In Fig. 5, each of the channel sweep periods is subdivided into four time base periods. Each channel sweep period corresponds to the amount of time necessary for transmitting one sample from each of the signal channels of the multiplex signal.

The channel sweep periods in each data word interval are numbered zero through 6 as shown in Fig. 5. The zero period of each interval is utilized for the transmission of a start signal to indicate whether or not information signals will be transmitted in each channel during the remainder of the data word interval. If the start signal is a mark it indicates that no information will be transmitted on that channel during the following data word interval. A space start signal indicates that information will be transmitted.

The channel sweep period 6 is utilized in the transmitter terminal 17 for the transmission of system supervisory signals such as continuity codes and signals for indicating the direct current condition of a teletype loop. In a receiving terminal, the supervisory information is not applied to the page printer but is utilized elsewhere in the receiving terminal. However, clock pulses, corresponding to those in the output of source 20, are generated in the receiving terminal and applied to the page printer during time interval 6 to mark the end of each data word interval. The clock pulses which are applied to monitor circuit 21 are utilized for a similar purpose and for another purpose as will be hereinafter described.

The time base period is established by a suitable timing wave such as an output of a frequency dividing type of circuit, the time base pulse source 19, which includes one pulse during each successive time period, the time base period. In one system, the source 19 is a ring-of-eleven circuit in which each stage thereof produces one output pulse in response to each eleven input pulses in a well known manner. One output thereof is utilized to drive the multiplexer 16 and a second output thereof, displaced in time from the first output, is applied to monitor circuit 21. Of course, a single output could be utilized for both purposes, but in one system for which a monitor circuit was constructed the above-mentioned second output was readily available for making external connections thereto.

It is also possible to select a ring-of-eleven circuit output including a pulse which occurs during any one of the different portions of each time base period, but the best operation has been found to result when the time base pulse occurs at, or near, the end of each transmission period for the channel being monitored. However, for various reasons, the individual channel signals which appear at the input to bridge 126 in Fig. 4 are somewhat delayed in point of time with respect to the corresponding signal transmissions on line 18 in Fig. 1. As a result the occurrence of each individual channel portion of the multiplex signal at the input to bridge 126 starts during one time base period and overlaps into the next succeeding time base period. Accordingly, it is advantageous to obtain a ring-of-eleven output which includes pulses occurring in the beginning of each time base period as illustrated in wave *a* of Fig. 5. The pulses of wave *a* may actually be about 500 microseconds in duration for MUX 4 operation.

In order to monitor channel 4 in MUX 4 operation, channel selector switch 30 is set, as illustrated, with armatures 66 and 67 in contacting engagement with contacts 68 and 76. MUX selector switch 37 is set, as illustrated, with armature 121 in contacting engagement with contact 120. In this condition, recurrent timing pulses are derived from the frequency divider circuit for use in connection with the sampling of channel 4 of a four-channel multiplex signal.

A rectangular clock pulse is applied from cathode 56 to selector switch 30 marking the end of a preceding data word interval. This pulse is differentiated by capacitor 62 and resistor 113 of multivibrator 31, and the negative-going differentiated pulse representing the trailing edge of the clock pulse is applied via diode 112 to control grid 96 in multivibrator 31. The negative pulse on grid 96 is of sufficient amplitude to bias triode 82 Off and triode 81 On regardless of the previous conduction condition of either of these tubes. In a similar manner the positive-going rectangular clock pulse is differentiated by capacitor 63 and the resistor 113 associated with multivibrator 32, and the resultant negative-going pulse is applied to multivibrator 32 to bias the triode 82 thereof Off and the triode 81 thereof On. Thus, the conducting conditions of multivibrators 31 and 32 are preset by the clock pulses thereby indexing the multivibrator outputs in point of time with respect to the time of occurrence of the clock pulses as determined by the setting of switch 30. The time constants of the multivibrator input connections from switch 30 are made to be longer than the time constants of the multivibrator input connections from lead 47 and anode 90 so that the indexing pulses will always control even though they may at some time coincide with a time base pulse. This operation will be subsequently described in detail.

Time base pulses from lead 47 are applied to multivibrator 31 via capacitor 102. Resistor 107 and capacitor 102 differentiate the leading edge of each time base pulse to produce a positive impulse in response thereto. The positive impulse is blocked by diodes 103 and 106 and has no effect on multivibrator 31. The trailing edge of the time base pulse is differentiated by capacitor 102, resistor 107, and the input resistance of multivibrator 31 in shunt with resistor 107 to produce a negative pulse. The negative pulse on grid 96 has no effect on triode 82 since that triode had been previously biased Off by the clock pulse as hereinbefore described. The negative pulse on grid 98 biases triode 81 Off thereby transferring conduction to triode 82 in a well known manner for bistable multivibrators. The negative-going voltage transition at anode 90 is coupled to multivibrator 32 via capacitor 118 and differentiated by capacitor 118 and resistor 107 and the input resistance of multivibrator 32, and the resultant negative differentiated pulse transfers conduction in multivibrator 32 from triode 81 to triode 82 thereby producing at anode 89 of multivibrator 32 a positive-going output pulse which is coupled to MUX selector switch 37 by resistor 119.

The second time base pulse to be applied to multivibrator 31 after a clock pulse results in the triggering of triode 81 On and triode 82 Off. A positive-going voltage transition now appears at anode 90 and is coupled via capacitor 118 to multivibrator 32. The positive-going transition is differentiated by capacitor 118 and resistor 107 in multivibrator 32. However, the positive-going differentiated pulse is blocked by the diodes 103 and 106 associated with multivibrator 32, and it has no effect on the conducting condition of that multivibrator.

Each subsequent time base pulse applied to multivibrator 31 causes a transfer of conduction between the tubes thereof and produces a negative-going voltage transition at anode 90 thereof for every other time base pulse. Each negative-going transition at anode 90 causes a transfer of conduction between the triodes of multivibrator 32 thereby producing a positive-going voltage transition at anode 89 in response to every second negative-going voltage transition at anode 90 of multivibrator 31. Thus a positive-going voltage transition is produced at anode 89 of multivibrator 32 in response to every fourth time base pulse which is applied to the input of multivibrator 31. Since multivibrators 31 and 32 had been preset by a clock pulse, as hereinbefore described, the positive-going voltage transition at anode 89 of multivibrator 32 always occurs during the transmission time for the fourth channel at the input to bridge 126. In the circuits illustrated, the last-mentioned time overlaps the channel 4 and channel 1 time base periods; and the positive-going voltage transition at anode 89 occurs at the beginning of each channel 1 time base period for monitoring channel 4. The latter result is illustrated by waves *d* and *e* in Fig. 5. The wave *d* is utilized, as will be hereinafter described, to time the operation of monitor circuit 21 for sampling the multiplex signal to extract from wave *f* the signal transmission in one of the multiplexed channels.

The above-described operation of the triodes in the multivibrators may be presented in tabular form as indicated below for the case described in which the fourth channel of a four-channel mulitplex signal is being monitored:

| Pulse | Tubes | | | |
|---|---|---|---|---|
| | Multivibrator 31 | | Multivibrator 32 | |
| | 81 | 82 | 81 | 82 |
| Index | On | Off | On | Off. |
| 1 | Off | On | Off | On. |
| 2 | On | Off | Off | On. |
| 3 | Off | On | On | Off. |
| 4 | On | Off | On | Off. |
| 1 | Off | On | Off | On. |

The pulses listed in the above table comprise an indexing pulse, wave *c*, which is the differentiated trailing edge of the clock pulse of wave *b*, that is utilized to preset the multivibrators, and the four successive time base pulses which occur during each channel sweep period. The triggering of triode 81 Off in multivibrator 32 in response to the time base pulse in the first time base period (second line of table) produces a positive-going transition at armature 121 of MUX selector switch 37 as hereinbefore described. The positive-going voltage is utilized in bridge 126 to sample the portion of the multiplex signal which occurred on line 18 in Fig. 1 during the fourth time base period of the channel sweep period preceding the index pulse mentioned on the table, which multiplex signal portion overlaps into the first time base period following such index pulse when it appears at the input to bridge 126. The second, third, and fourth time base pulses do not produce a positive-going voltage transition at anode 89 of triode 81 in multivibrator 32, and no multiplex signal sampling results therefrom. The time base pulse in the first time base period of the second channel sweep period following the index pulse (last line of table) produces another positive-going voltage transition at the anode of triode 81 in multivibrator 32, which transition is utilized to produce another sampling of the multiplex signal as hereinbefore described.

During each subsequent channel sweep interval the same operation is repeated. After seven such channel sweep intervals have been completed, the differentiated trailing edge of a clock pulse is applied, as hereinbefore described, via selector switch 30 to index the multivibrators. However, the latter pulse has no effect upon the multivibrators since it tends to establish a tube conduction pattern which is identical to the pattern established by the preceding fourth time base pulse. This is apparent from the above table by comparing the tube conduction pattern resulting in response to the index pulse with the pattern which occurs in response to the fourth time base pulse. If the tubes had been in some conduction condition other than that shown as resulting from the fourth time base pulse, the subsequent indexing pulse then would preset the tubes in the conduction pattern shown in the table; and the next time base pulse would follow with the results indicated.

The output of multivibrator 32 which appears at armature 121 is illustrated in wave *d* of Fig. 5 and comprises a rectangular voltage wave with equal positive-going and negative-going portions, of two time base periods duration each. Each positive-going portion is initiated in the beginning portion of the first time base period of each channel sweep period. The leading edge of each positive-going portion is a positive-going voltage transition which is hereinafter referred to as a timing impulse.

If armature 121 is operated into contacting engagement with contact 117 for MUX 2 operation, the above-described circuits operate in a similar manner. However, in this mode of operation the frequency of the time base pulses from source 19 is halved, and the frequency divider circuit output is derived from anode 89 of multivibrator 31 via resistor 116. Consequently, the wave *d* of Fig. 5 would have the same configuration with the same frequency as the illustrated wave. In other words, the time base periods are doubled and the channel sweep period remains the same since only two channels are being transmitted. The data word interval continues to have the same duration on a time basis, and includes the same number of channel sweep periods that were included during MUX 4 operation. The positive-going voltage transitions, timing impulses, in wave *e* which occur during the first time base period of each channel sweep period are now utilized for sampling transmission on channel 2 of the MUX 2 transmission. Switch 30 must be set with armature 66 in contacting engagement with contact 68 or contact 70 to assure proper indexing for monitoring channel 2.

For MUX 1 operation, armature 121 is operated into contacting engagement with the contact 48, and positive-going time base pulses of wave *a* are applied directly from lead 47 to MUX selector switch 37. In this condition the leading edge of each time base pulse provides the positive-going voltage transition needed for sampling. The time base periods are now four times as long as they were in the MUX 4 operation. The wave *d*, which included positive-going voltage transitions in response to the trailing edge of one time base pulse in each channel sweep period, now comprises simply one time base pulse in each channel sweep period at the beginning thereof.

Referring to Fig. 4, the remaining portion of monitor 21 comprises a clamp circuit 140 connected to lead 123 for controlling the magnitude of sampling pulses applied to bridge 126. Clamp circuit 140 operates somewhat in the manner of a direct current restorer. Clamp circuit 140 comprises a battery 141 having the negative terminal thereof connected to ground. A potential divider comprising the series-connected resistors 142 and 143 is connected in series between the positive terminal of battery 141 and ground. A diode 146 is connected between lead 123 and a terminal 147 which is common to resistors 142 and 143.

The terminals **148*a* and 148*b* comprise an input circuit for receiving time division multiplex signals in monitor circuit 21 from the transmission medium 18 illustrated in Fig. 1. Terminal 148*b* is connected to ground. An amplifier-limiter circuit 149 is provided for coupling multiplex signals from terminal 148*a* to a double-tuned discriminator circuit 150**.

Amplifier-limiter 149 comprises a resistance-capacitance-coupled amplifier including a triode 151 having the anode 152 thereof connected to the positive terminal of a battery 153 via a load resistor 156. The negative terminal of battery 153 is grounded. Control grid 157 of triode 151 is coupled to terminal **148*a* by a capacitor 158. Grid 157 is returned to ground via a resistor 159. The cathode 160 of triode 151 is returned to ground via a self-bias resistor 161 which is shunted by a by-pass capacitor 162. The amplifier output is coupled from anode 152 via a capacitor 163 to a control grid 166 of a saturation limiter triode 167**.

Capacitor 163 is shunted by a current limiting resistor 168. The cathode 169 of triode 167 is connected to ground by a self-bias resistor 170 which is shunted by a by-pass capacitor 171. Operating potential for the anode 172 of triode 167 is supplied from the positive terminal of a battery 173, which is illustrated in discriminator 150, via the two parallel resonant circuits 176 and 177 of discriminator 150. The negative terminal of battery 173 is grounded. Triode 167 is normally biased for a predetermined value of cathode current by resistor 170 and the voltage present at the anode of triode 151 in the absence of signal. Triode 167 is operated between saturated conduction and cut-off in response to signal amplitudes in excess of a predetermined peak-to-peak amplitude. As noted above, resistor 168 limits the magnitude of ground current. The limiting function is included in amplifier-limiter 149 to provide a fixed maximum output current thereby facilitating the design of the mark reinsertion circuits associated with triode 130 in Fig. 3.

Resonant circuits 176 and 177 in descriminator 150 comprise inductances 178 and 179, fixed capacitors 180 and 181, and variable capacitors 182 and 183, respectively. Resonant circuit 176 is tuned to the mark frequency of the multiplex transmission system and resonant circuit 177 is tuned to the space frequency of the system. Inductances 178 and 179 may be transformer primary windings having inductively coupled thereto two secondary winding inductances 188 and 189, respectively. Capacitors 190 and 191 are filter capacitors which co-operate with resistors 198 and 199 to smooth the envelope of the multiplex signals. Diodes 192 and 193 are connected in series with inductances 188 and 189, respectively, and are poled for conduction in opposite directions with respect to a grounded terminal 196 which is common to inductances 188 and 189. Diode 192 blocks negative voltages in inductance 188 and diode 193 blocks positive voltages in inductance 189. Accordingly, on mark signals, when the voltage developed across resonant circuit 176 is larger than the voltage developed across resonant circuit 177, the positive-going half cycles of the oscillations predominate so that the net discriminator output is positive for mark signals. On space signals the voltage developed across resonant circuit 177 is larger than the voltage developed across circuit 176 and the net discriminator output on negative half cycles has a greater amplitude than the output on positive half cycles.

The cathode of diode 192 is connected to a terminal 197 of bridge 126 via a resistor 198. The anode of diode 193 is connected to terminal 197 via a resistor 199, and terminal 197 is connected to ground via a capacitor 200. Resistors 198 and 199 each comprise, with capacitor 200, an integrating circuit which tends to pass the envelope of the oscillation output wave from discriminator 150 while rejecting the individual oscillations. The integrating circuit also tends to soften envelope voltage transitions which are applied to bridge 126 from discriminator 150. In a typical circuit such voltage transitions at terminal 197 may comprise +.3 volt for mark signals and −.3 volt for space signals.

Diode bridge 126 is a polarized gate such as the gate hereinbefore discussed briefly in connection with Fig. 2. Bridge 126 comprises four diodes, 206 through 209, connected in series in a loop. The four diodes are all poled for the conduction of electric current in a counter-clockwise direction through the bridge loop. A first diagonal of the bridge connects a terminal 210 which is common to diodes 206 and 207 with a terminal 211 which is common to diodes 208 and 209. This first diagonal comprises the resistors 212 and 213 connected in series between terminals 210 and 211 and having a terminal 216 which is common to both resistors connected to the lead 123 from MUX selector switch 37 in Fig. 3. A second diagonal of the bridge is found between the terminal 197 which is common to diodes 206 and 209 and a grounded terminal 217 which is common to diodes 207 and 208. Multiplexed mark and space signals are applied from discriminator 150 to bridge 126 across the second diagonal between terminals 197 and 217.

Output signals from bridge 126 are connected from terminal 210 to a space amplifier 218. Bridge output from terminal 211 is connected to a mark amplifier 219. As will be evident from the subsequent discussion of the operation of monitor circuit 21, the positive and negative sampling signals applied to terminal 216 of the first diagonal and the positive and negative multiplex signals applied across the second diagonal bias the bridge diodes in synchronism in such a manner that positive-going voltage transitions in excess of a predetermined magnitude can occur at the terminals 210 and 211 of the bridge only during the sampling time of the desired channel.

The last-mentioned predetermined magnitude corresponds to the cathode self bias in toggle circuit 232 which will be hereinafter described.

The mark and space amplifiers 219 and 218 are identical and each comprises a triode 220 having the control grid 221 thereof connected to the corresponding output terminal of bridge 126. The anode 222 of each amplifier is connected via a load resistor 223 to the positive terminal of a battery 226 which has the negative terminal thereof grounded. The cathodes 227 of triodes 220 are connected to ground via self-bias resistors 228 which are shunted by the by-pass capacitors 229. The outputs of the mark and space amplifiers are coupled from the anodes 222 via capacitors 231 to the input terminals of a bistable toggle circuit 232.

Toggle circuit 232 is a bistable multivibrator which comprises the triodes 233 and 236. Cathodes 237 and 238 of triodes 233 and 236, respectively, are both connected to a terminal 239 which is connected to ground via a self-bias resistor 240. Resistor 240 is shunted by a capacitor 241. The anodes 242 and 243 of triodes 233 and 236 are connected via load resistors 246 and 247, respectively, to the positive terminal of a battery 248 which has the negative terminal thereof connected to ground. Anode 242 is cross-coupled to control grid 249 via a parallel resistance-capacitance circuit 250 and grid 249 is returned to ground via a resistor 251. Anode 243 is cross-coupled to control grid 252 via a parallel resistance-capacitance circuit 253 and grid 252 is returned to ground by a resistor 256.

The output of mark amplifier 219 is coupled to control grid 249 via a diode 257 which is poled for conduction away from grid 249. The cathode of diode 257 is connected to terminal 239 by a resistor 258. The output of space amplifier 218 is coupled from capacitor 231 thereof to control grid 252 via a diode 259 which is poled for conduction away from grid 252. The cathode of diode 259 is connected to terminal 239 by a resistor 260. Capacitors 231 in the mark and space amplifiers together with the resistors 258 and 260, respectively, comprise differentiating circuits for coupling triggering pulses from the mark and space amplifiers to toggle circuit 232 while at the same time further diminishing the effect of the hereinbefore mentioned integrated data signal voltage transitions. The input resistances of toggle circuit 232 are included in the differentiating circuits when diode 257 or diode 259 is biased for forward conduction.

Anode 242 is connected to ground by a resistor 261 and anode 243 is connected to the input of a direct current amplifier 262 via a resistor 263.

Amplifier 262 comprises two vacuum tube triodes 266 and 267 which are essentially driven in parallel by toggle 232. The control grids 268 and 269 of triodes 266 and 267 are differently biased since a terminal 270 which is common to resistor 263 and control grid 268 is connected to grid 269 via a resistor 271. The negative terminal of a battery 272 is connected to terminal 270 via a series circuit comprising a resistor 273 and a rheostat 276. The cathodes 277 and 278 of triodes 266 and 267 are connected directly to ground. The anodes 279 and 280 are connected together and page printer 28 is connected in series between the common-connected anodes 279 and 280 and the positive terminal of a battery 281 which has the negative terminal thereof grounded.

Considering now the operation of monitor circuit 21, the output of the frequency divider circuit comprises the wave *d* of Fig. 5 as hereinbefore noted. Negative-going portions of wave *d* are coupled directly to terminal 216. However, positive-going portions thereof may bring clamp circuit 140 into operation. When a positive-going portion of the wave *d* as coupled via capacitor 122 attains a potential which at least equals the potential drop across resistor 143, diode 146 is biased into conduction and clamps the potential of terminal 216 to the potential at terminal 147. Resistors 212 and 213 will have substantially no effect upon this phase of the circuit operation since each of them may typically have a resistance which is two orders of magnitude larger than the resistance of resistor 143. Thus, the waveform at terminal 216 in bridge 126 corresponds substantially to the wave *e* illustrated in Fig. 4. Clamp circuit 140 is employed principally for MUX 1 operation when wave *d* comprises time base pulses, as in wave *a*; and it is necessary to insert a direct current component so that the wave *e* will have positive and negative excursions of approximately the same amplitude. Clamp circuit 140 does not have a substantial effect in MUX 2 or MUX 4 operation because wave *e* includes significant negative excursions in these modes.

Mark and space voltage variations on bridge input terminal 197 are illustrated in wave *f* of Fig. 5 for eight successive channel sweep periods. It will be noted in wave *f* that the transitions between marks and spaces do not occur exactly at the boundaries between time base periods. A delay is apparent and is due to a number of factors such as the delay in the integrating circuit in the output of discriminator 150 and envelope delays in carrier equipment in the transmitting terminal 17. The amount of the delay may be, for example, one half of a millisecond which is sufficient to put the trailing edge of each mark and space in the time base period following the time base period in which the leading edge occurred.

The time base periods for channels 1 through 4 in the zero channel sweep periods of wave *f* include alternate marks and spaces starting with a mark in time base period 1. This indicates that no signals will be transmitted on channels 1 and 3, and that signals will be transmitted on channels 2 and 4. An examination of the remainder of wave *f* bears this out since the data in channels 1 and 3 are always mark while the data in channels 2 and 4 may be either mark or space.

The data input to bridge 126 in channel sweep period 6 of wave *f* includes both the supervisory data signals transmitted in period 6 and the continuous reinserted mark for channel sweep period 6 which was hereinbefore mentioned in connection with triode 130 of Fig. 3. The reinserted mark is a clock pulse which has an amplitude larger than the amplitude of data from discriminator 150 to assure a mark output from bridge 126 even though the supervisory information may include space signals. As illustrated in wave *f*, the supervisory data includes a space in time base period 1, but the net data input signal to bridge 126 is still at an amplitude which is greater than the normal mark amplitude. The clock pulse in wave *f* is delayed as hereinbefore mentioned in connection with the input and output integrating circuits of triode 130. By delaying the clock pulses the leading edge thereof is held up until after the occurrence of the time base pulse in time base period 1 of channel sweep period 6, which time base pulse effects the sampling for time base period 4 of channel sweep period 5. In addition, the delay holds up the trailing edge of the clock pulse by a similar amount so that the data which is sampled for time base period 4 of channel sweep period 6 will always be a mark thereby assuring proper operation of page printer 28 in response to the end of each data word interval.

As hereinbefore noted, resistors 198 and 199 co-operate with capacitor 200 to integrate waveform *f*. However, the time constants are of such value that the result is only a slight softening, or rounding, of the voltage transitions. This rounding effect is detectable in wave *f* of Fig. 5. The rounding effect together with the differentiating effect hereinbefore noted at the inputs to toggle circuit 232 provides extra assurance that toggle 232 will not be triggered in response to mark-space voltage transitions.

The large resistances of resistors 212 and 213 across the first diagonal of bridge 126 practically eliminate the sampling voltages of wave *e* from any biasing effect on the diodes of bridge 126. The diodes are biased On or Off in pairs by the mark-space signals of wave *f*. Mark signals bias diodes 206 and 207 On and diodes 208 and 209 Off. Space signals bias diodes 206 and 207 Off and diodes 208 and 209 On. The positive portions of sampling voltage wave *e* will tend to bias one of the Off diodes On. However, resistors 212 and 213 are so large that a significant amount of current cannot be driven through such diode, and for all practical purposes the diode may be considered to be Off.

When a pair of diodes is On, the intermediate terminal thereof is held at a relatively small range of voltages with respect to ground potential. This is illustrated in waves *g* and *h*. When the same pair of diodes is Off, the potential at its intermediate terminal tends to follow the corresponding portion of the sampling voltage wave *e*. Accordingly, the diode bridge 126 is polarized by the mark-space signals for the transmission of the sampling voltage wave to one or the other of terminals 210 and 211.

Due to the combined effects of the integrating circuits in the output of discriminator 150 and of the differentiating circuits in the inputs of toggle circuit 232, only the positive-going sampling voltage transitions, the timing impulses, are of sufficient amplitude after differentiation to trigger toggle circuit 232. Each of the positive-going impulses in waves *g* and *h* produces a negative-going output pulse on the anode of the corresponding mark or space amplifier. That output pulse is applied to toggle circuit 232; and, if the pulse has a sharp leading edge, the differentiated form thereof has sufficient amplitude to trigger the toggle 232 and may transfer conduction between triodes 233 and 236. The triggering action indicates coincidence of a timing impulse and a mark or a space in the inputs of bridge 126.

The differentiated output voltages of the mark and space amplifiers 218 and 219 are illustrated in waves *i* and *j* of Fig. 4. Diodes 257 and 259 block positive pulses so that only the negative pulses at the mark and space amplifier anodes reach toggle circuit 232. The small amplitude transitions of waves *g* and *h*, as well as rounded or significantly sloping transitions, practically disappear upon differentiation; and they are of insufficient amplitude to overcome the cathode bias caused by current flowing in self-bias resistor 240. Consequently, they cannot trigger toggle 232.

The output of toggle 232 at anode 243 is illustrated in wave *k* and comprises a direct voltage of variable amplitude with the maximum amplitudes representing mark signals in the monitored channel and the minimum amplitudes representing space signals on the monitored channel. It will be noted that the fifth negative pulse illustrated in wave *i* has no effect on the output of toggle circuit 232 as illustrated in wave *k* since the toggle circuit 232 was already operating in the mark condition before this impulse was applied.

Referring to waves *f* and *k* it will be observed that the mark and space signals in each channel sweep period in wave *k* correspond to the same signals in the fourth time base period of each preceding channel sweep period, thus indicating that the toggle output represents the transmitted signal in the fourth input channel to the transmitting terminal. The leading edges of the mark and space signals in wave *k* are delayed by approximately one time base period after the leading edges of the corresponding data signals in wave *f*, and this delay represents the delay between the beginning of a multiplex signal bit at the input to bridge 126 in each particular time base period and the subsequent occurrence of a time base pulse for sampling such multiplex signal bit.

It is apparent that the sampling, or timing, signals which are applied from lead 123 to diode bridge 126 are steered by bridge 126 to the correct input of toggle circuit 232 to actuate toggle circuit 232 at the correct time for reproducing mark-space signals representing the mark-space signals in the predetermined one channel of the multiplex signal. Stating the same proposition in a different manner, bridge circuit 126 is responsive to multiplex signals and to sampling voltages, which are a function of standard timing signals, for effectively sampling the multiplex signal at the proper times to extract therefrom the mark-space signals from a predetermined one of the multiplexed signal channels. Mark-space signals from other channels are rejected since no sampling impulses are generated in the time base periods corresponding thereto.

While this invention has been described in connection with particular embodiments and applications thereof, it is to be understood that other embodiments and modifications thereof which will be obvious to those skilled in the art are included within the scope of the invention as described in the following claims.

What is claimed is:

1. An electric circuit for monitoring mark and space signals in a single channel of a time division multiplex signal, said circuit comprising an input circuit for receiving said multiplex signal, a source of timing signals for producing a timing impulse during each of the transmission times of signals in said single channel, a sampling circuit having two output terminals for producing voltage amplitude transitions at said output terminals in response to the coincidence of a portion of said multiplex signal with one of said recurrent timing impulses, said sampling circuit comprising a gate circuit including four diodes connected respectively as the four arms of a bridge, means for connecting said output terminals to the terminals of a first diagonal of said bridge, means for applying said timing impulses to the terminals of said first diagonal, means connected to said input circuit for applying said multiplex signal across a second diagonal of said bridge for biasing said diodes for the coupling of said timing impulses through said bridge to one or the other of said output terminals in response to mark or space signals, respectively, utilization means, and means connected to said output terminals for coupling said timing impulses to said utilization means.

2. The electric circuit in accordance with claim 1 in which said four diodes are poled for conduction around said bridge in the same direction, said means for applying said multiplex signals across said second diagonal comprises means for connecting one terminal of said second diagonal to ground and means for connecting the other terminal of said second diagonal to said input circuit for applying said mark and space signals to said other terminal with different polarities, respectively, with respect to ground, said mark and space signals, respectively, each tending to bias two of said diodes Off which are connected to one of said output terminals and tending to bias the other two of said diodes On which are connected to the other of said output terminals thereby tending to clamp said other output terminal at substantially ground potential, and said means for applying said timing impulses to the terminals of said first diagonal comprises two resistors connected in series between the terminals of said first diagonal, and means for connecting the common junction of said two resistors to said source of timing impulses for coupling to said other output terminal a voltage transition of predetermined minimum magnitude.

3. The electric circuit in accordance with claim 1 in which said means for applying said timing impulses comprises a capacitor connected from said timing signal source to the terminals of said first diagonal, a clamp circuit for limiting the peak potential excursions of said impulses, said clamp circuit including a source of potential, a potential divider connected across said potential source, and a diode connected between the sampling circuit side of said capacitor and an intermediate point on said potential divider, said diode being normally biased Off in the absence of a positive-going voltage portion of said timing signal source.

4. An electric circuit for monitoring the signal in a single channel of a time division multiplex transmission system, said electric circuit comprising an input circuit for receiving interleaved mark and space signals from all channels of said multiplex system, a source of timing signals for producing recurring timing impulses of a predetermined magnitude and polarity and coincident with the occurrence in said input circuit of a portion of each signal in said single channel, a sampling circuit having two output terminals for producing voltage magnitude transitions at different ones of said output terminals in response to the coincidence at the input thereof of said mark signals or said space signals, respectively, with said timing impulses, said sampling circuit comprising four diodes connected as the arms of a bridge circuit, said diodes all being poled for conduction around said bridge in the same direction, resistance means connected across a first diagonal of said bridge circuit, means for connecting said output terminals to the terminals of said first diagonal, means connected to said input circuit for applying said interleaved mark and space signals across a second diagonal of said bridge with different polarities with respect to ground, one terminal of said second diagonal being grounded, said mark and space signals each tending to bias a different two of said four diodes On for forward conduction thereby clamping a different one of said output terminals at substantially ground potential, and means for applying said timing impulses to an intermediate point of said resistance means to bias the other one of said output terminals at a positive potential with respect to ground thereby producing positive-going voltage transitions at said other output terminal, and means coupled to said output terminals and responsive to said transitions for producing visible representations of said single channel signal.

5. An electric circuit in accordance with claim 4 in which said timing signal source includes a source of time base signals comprising a train of pulses having a recurrence rate equal to the multiplex bit rate of said multiplex signal, a source of clocking signals providing a train of pulses having a recurrence rate which bears a predetermined ratio to said time base signal recurrence rate, said ratio being less than unity, two multivibrator circuits each having two input connections and at least one output connection, said multivibrator circuits each having two stable conduction conditions, connections for coupling said multivibrator circuits in a frequency divider circuit, means for applying said time base signals to both input connections of a first one of said multivibrator circuits, selector means for deriving said timing impulses from different output terminals of said multivibrator circuits at repetition rates equal to predetermined submultiples of said time base signal pulse recurrence rate, and means for applying said clocking pulses simultaneously to one input of each of said multivibrator circuits for presetting said multivibrators in predetermined stability conditions whereby said timing impulses occur at said first diagonal simultaneously with the occurrence at said second diagonal of signals of said single channel.

6. An electric circuit for monitoring the mark and space signals in a single channel of a time division multiplex signal, said circuit comprising an input circuit for receiving sad multiplex signal, a source of timing signals for producing recurrent timing impulses at predetermined times, said timing signal source comprising a first source of pulses having a pulse recurrence rate equal to the channel scanning rate in said multiplex system, a second source of pulses having a lower pulse recurrence rate, two multivibrator circuits each having two input connections and at least one output connection and two stable conduction conditions, means for coupling said multivibrator circuits together in a frequency divider circuit whereby the application of triggering pulses to said input connections of a first one of said multivibrator circuits causes timing impulses to be produced in said output circuits of said multivibrator circuits with different recurrence rates which are submultiples of said channel scanning rate, means for applying the pulses from said first pulse source for actuating said frequency divider circuit, and means for applying pulses from said second source to one of said input connections of each of said multivibrator circuits simultaneously for presetting said frequency divider circuit in a predetermined stability condition whereby the timing impulses at one of said multivibrator circuit output connections occur simultaneously with predetermined portions of said multiplex signal, said electric circuit further comprising a polarized gate circuit having two input connections and two output connections, selector means for applying said timing impulses from one output connection of said frequency divider circuit to one of said gate circuit input connections, means for applying all mark and space signals of said multiplex signal to the other one of said gate circuit input connections for gating said timing impulses therethrough to one or the other of said gate circuit output connections in response to mark or space signals, respectively, utilization means, and means connected to said gate circuit output connections for coupling the output of said gate circuit to said utilization means.

7. The electric circuit in accordance with claim 6 wherein each of said multivibrator circuits comprises a bistable multivibrator including two electron discharge devices each having an anode, a cathode, and a control grid, means for supplying operating potential to said anode and cathode electrodes, means for cross coupling the anode of each of said devices to the control grid of the other one of said devices, and a different pair of diodes connected to each control grid, each of said pairs of diodes having one electrode of each diode thereof connected in multiple to their respective control grids, said means for applying pulses from said first source comprises means for connecting the remaining electrode of one of said diodes at each of said control grids of said first multivibrator circuit in multiple and for coupling one output of said first multivibrator to the remaining electrode of one of said diodes at each of said control grids of said second multivibrator circuit in multiple, and said means for applying said pulses from said second source comprises means for selectively coupling the pulses of said second source to the remaining electrode of the remaining diode at one control grid of each of said multivibrator circuits.

8. A diode bridge circuit for use in a device for deriving an output from the portions of a multiplex signal representing mark and space signals in a single one of the multiplexed signal channels, said bridge circuit comprising four diodes connected as the arms of a bridge circuit, said diodes all being poled for conduction around said bridge in the same direction, resistance means connected between the terminals of a first diagonal of said bridge circuit, two output terminals connected to said terminals of said first diagonal, means for applying said multiplex signal across a second diagonal of said bridge with said mark and space signals having different polarities with respect to ground, a ground connection to one terminal of said second diagonal, and means for applying timing signals between ground and an intermediate point of said resistance means for producing voltages between ground and a different one of said two output terminals in response to positive and multiplex signal input voltages, respectively.

9. A demultiplexer for a time division multiplex system which transmits in an interleaved manner mark and space signals from a predetermined number of channels, said mark and space signals being interleaved at a predetermined multiplex bit rate, one bit from each channel being transmitted in a given interval to establish a channel sweep rate, and the multiplex word rate for said system corresponding to the frequency at which all channels are swept a predetermined number of times, said demultiplexer comprising an input circuit for receiving said interleaved multiplex signals, a timing signal source for producing signals at said multiplex channel sweep rate, means in said timing signal source for indexing said timing signals to occur in a predetermined relation with respect to the multiplex bit transmission intervals for a predetermined one of said signal channels, a sampling circuit having two output terminals for producing voltage amplitude transitions of a predetermined character at said output terminals in response to the coincidence at said sampling circuit of said bit transmission intervals of said one channel with said recurrent timing pulses, said sampling circuit comprising a gate circuit including four diodes connected as the four arms of a bridge, means for connecting said sampling circuit output terminals to the terminals of a first diagonal of said bridge, means for applying said timing signals to the terminals of said first diagonal and means connected to said input circuit for applying said multiplex signals between the terminals of a second diagonal of said bridge for enabling the coupling of said timing signals through said bridge to one or the other of said output terminals in response to mark or space signals, respectively, a teletypewriter page printer, and means for coupling the output of said gate circuit to said page printer for actuating said printer to produce visual representations of said mark and space signals in said one channel.

10. The demultiplexer in accordance with claim 9 in which said four diodes are poled for conduction around said bridge in the same direction, said means for applying said timing signals to said first diagonal comprises two resistors connected in series between the terminals of said first diagonal and means for connecting the common junction of said two resistors to said source of timing signals, said means for applying said multiplex signals across said second diagonal comprises means for connecting one terminal of said second diagonal to ground and means for connecting the other terminal of said second diagonal to said multiplex signal applying means for applying said mark and space signals to said other terminal with different polarities, respectively, with respect to ground, and said mark and space signals, respectively, each tend to bias two of said diodes Off which are connected to a different one of said output terminals and bias the other two diodes On which are connected to the other of said output terminals thereby clamping said other output terminal at approximately ground potential.

11. A demultiplexer for a time division multiplex transmission system for translating mark and space signals from a predetermined number of channels which are interleaved at a predetermined multiplex bit rate, one bit from each channel being transmitted in an interval of predetermined duration to establish a channel sweep rate and in which all of said channels are sampled a predetermined number of times in a given period to establish the multiplex word rate, said demultiplexer comprising an input circuit for receiving said multiplex mark and space signals, a timing signal source comprising a first source of pulses having a pulse recurrence rate equal to said multiplex bit rate, a second source of pulses having a pulse recurrence rate equal to said multiplex word rate, two multivibrator circuits each having two input connections and at least one output connection and two stable conduction conditions, means for coupling said multivibrator circuits together in a frequency divider circuit whereby the application of triggering pulses to one input of said first multivibrator circuit causes a timing signal pulse to be produced in an output connection of said first multivibrator circuit in response to every second one of said triggering pulses and in an output connection of said second multivibrator circuit in response to every fourth one of said triggering pulses, means for applying pulses from said first source to said one input connection of said first multivibrator circuit for triggering said first multivibrator circuit back and forth between its two stable conduction conditions, selector means for deriving timing impulses from different ones of said output connections of said frequency divider circuit, and means for applying pulses from said second source simultaneously to one input of each of said multivibrator circuits for presetting said frequency divider circuit in a predetermined stability condition whereby said timing impulses occur in a predetermined relation with respect to the transmission intervals of said single channel, a sampling circuit having two output terminals for producing voltage amplitude transitions at said output terminals in response to the coincidence at said sampling circuit of a portion of said multiplex signal with one of said timing impulses, said sampling circuit comprising a gate circuit including four diodes connected as the four arms of a bridge, means for connecting said output terminals to the terminals of a first diagonal of said bridge, means applying said timing impulses to the terminals of said first diagonal, means connected to said input circuit for applying said multiplex signals between the terminals of a second diagonal of said bridge for biasing said diodes to enable the transmission of said timing impulses through said bridge to one or the other of said output terminals in response to mark or space signals, respectively, a teletypewriter page printer, and means connected to said sampling circuit output terminals for coupling said voltage amplitude transitions to said page printer for producing in said page printer visual representations of said mark and space signals in said one channel only.

12. A demultiplexer for use in connection with a time division multiplex transmission system, said demultiplexer comprising a frequency divider, a source of time base signals having a frequency which is equal to the multiplex bit rate of said system, means for applying said time base signals to said frequency divider for generating output impulses at a rate which is equal to the recurrence rate of multiplex transmissions in one of the multiplexed signal channels, and indexing means comprising a source for producing indexing pulses at a rate which is a submultiple of said bit rate and a different submultiple of said output impulse rate, and means for selectively applying said indexing pulses to different inputs of said frequency divider for indexing the output pulses thereof to be coincident with transmissions in a predetermined one of the multiplexed signal channels.

13. A polarized gate circuit, said gate circuit having two input connections and two output connections, all four of said connections having a common reference terminal, means for applying timing impulses to one of said input connections, and means for applying positive and negative voltage signals to the second of said input connections for polarizing said gate circuit for the transmission of a certain portion of each of said timing impulses therethrough to one only of said output connections in response to said positive voltage signals and to the other only of said output connections in response to said negative voltage signals, respectively.

14. A gate circuit comprising a bridge including four diodes, each of said diodes being connected in one branch of said bridge, all of said diodes being poled for conduction in the same direction around said bridge, means connecting one terminal of a first diagonal of said bridge to ground, a first input circuit connected between the terminals of said first diagonal, two resistors connected in series between the terminals of a second diagonal of said bridge, a second input circuit connected between ground and a terminal common to both of said two resistors, and a separate output circuit connected between ground and each one of the terminals of said second diagonal.

15. A gate circuit comprising first, second, third and fourth diodes connected in series for forward conduction in the order named in a loop circuit, each of said diodes having a low resistance condition in response to forward voltage bias applied thereto and a substantially higher resistance condition in response to reverse voltage bias applied thereto, means connecting the anode of said first diode to ground, a first input circuit connected between the anode of said first diode and the cathode of said second diode, two resistors connected in series between the cathode of said first diode and the anode of said fourth diode, each of said resistors having a resistance which is much larger than the resistance of one of said diodes in its low resistance condition, a second input circuit connected between ground and a terminal common to both of said resistors, and a separate output circuit connected between ground and the anode of each of said second and fourth diodes.

References Cited in the file of this patent

UNITED STATES PATENTS

| | | |
|---|---|---|
| 2,220,098 | Guanella | Nov. 5, 1940 |
| 2,700,763 | Foin | Jan. 25, 1955 |
| 2,728,042 | Ruhland | Dec. 20, 1955 |
| 2,834,833 | Segerstrom | May 13, 1958 |
| 2,851,617 | Walker | Sept. 9, 1958 |